United States Patent

[15] 3,649,837
[45] Mar. 14, 1972

Lehovec

[54] DIFFRACTIVE IMAGE-FORMING MEANS INTEGRATED INTO SEMICONDUCTING DEVICES

[72] Inventor: Kurt Lehovec, 11 Woodlawn Drive, Williamstown, Mass. 01267

[22] Filed: Apr. 27, 1970

[21] Appl. No.: 32,160

Related U.S. Application Data

[63] Continuation-in-part of Ser. No. 653,245, July 13, 1967, Pat. No. 3,569,997.

[52] U.S. Cl. ....................250/211 J, 250/217 SS, 313/108 D, 317/235 N, 350/162 ZP

[51] Int. Cl. ....................G02b 5/18, H01j 39/12, H01l 11/00

[58] Field of Search...........317/235 UA, 235 N; 350/162 ZP; 250/217 SS, 83.3 IR, 211 J, 214; 313/110, 108 D

[56] References Cited

OTHER PUBLICATIONS

" Schottky barrier devices show current increase under pressure," Electronics, Sept. 15, 1969, pp. 223–224

Baertsch et al., " An Ag–GaAs Schottky–Barrier Ultraviolet Detector," Journal of Applied Physics, Vol. 40, NO. 1, Jan. 1969, pp. 229–235

*Primary Examiner*—James W. Lawrence
*Assistant Examiner*—T. N. Grigsby

[57] ABSTRACT

Integrated electro-optical structures are disclosed which comprise a diffractive image-forming means on a transparent semiconductive body in optical alignment with a photoelectric element on said body. In particular, image-forming means and photoelectrical element are located at the same surface of said body and radiation passes between them by reflection on the opposite surface of the body. This arrangement permits extensive electric integration of conducting portions of image-forming means with a photoelectric device.

16 Claims, 7 Drawing Figures

DIFFRACTIVE IMAGE-FORMING MEANS INTEGRATED INTO SEMICONDUCTING DEVICES

CROSS-REFERENCE TO RELATED APPLICATION

This application is a continuation-in-part of U.S. application Ser. No. 653,245, now U.S. Pat. No. 3,569,997, filed on July 13, 1967.

BACKGROUND OF THE INVENTION

Application Ser. No. 653,245, now U.S. Pat. No. 3,569,997, teaches the intimate inseparable combination of zone plate optics with semiconductive photoelectric devices into monolithic solid-state structures. Application Ser. No. 653,245 also teaches the use of a portion of the zone plate as part of an electrical structure in addition to its use as an optical component.

There is a large variety of structures within the broad scope of the inventive concept of Ser. No. 653,245 due to the many types of photoelectric semiconductive devices, and due to the many ways in which a conducting segment of a zone plate can be used as portion of electrical components.

It is a first object of the present invention to describe integrated monolithic solid combinations of zone plates with photoelectric devices which offer new and unexpected advantages with respect to simplicity of structure and usefulness.

It is another object of this invention to describe integrated combinations of a photocell, an amplifying element for the photoelectric current of said photocell and a zone plate optics.

It is yet another object of this invention to describe integrated combination of a zone plate optics with a plurality of photocells.

It is still another object of this invention to describe the integration of a zone plate optics with an ovonic switch thereby causing optically controlled switching action of improved reliability.

These and other objectives of my invention will be described in what follows.

BRIEF SUMMARY OF THE INVENTION

This invention concerns the integration of certain devices of the broad class of photoelectric devices as defined in my application Ser. No. 653,245, now U.S. Pat. No. 3,569,997, with a diffractive image-forming means, whereby both photoelectric device and image-forming means are located at a surface of a transparent semiconducting body. This body has the dual function of optical spacing of photoelectric device from image-forming means and of electric element for the semiconducting device.

The photoelectric devices of this invention are photocells and/or light emitters. Because of the well-known reversibility of direction of radiation with respect to image-forming means, for each inventive arrangement of a photocell with respect to a diffractive optical means there exists a corresponding arrangement involving a light emitter replacing the photocell.

In order that the semiconducting body is transparent to the radiation in question, the photoelectric devices must be active with respect to radiation of a wavelength which is longer than that corresponding to the absorption edge of the semiconducting body. This is achieved by using Schottky barrier diodes as photocells and heterojunctions between the semiconducting body and another semiconductor of smaller band gap as light emitters and/or photocells.

While the diffractive image-forming means can be located (i) at the same surface of the transparent body as the photoelectric device, or else (ii) at the opposite surface; as illustrated in FIG. 9 of my application Ser. No. 653,245, now U.S. Patent No. 3,569,997, or else (iii) at a surface substantially at right angles from the photoelectric device, the location at the same surface offers particular advantages for planar technology processing, for precise alignment between image-forming means and photoelectric device, and for electric integration of portions of the zone plate with the photoelectric device or associated circuitry. In this preferred case, the back surface is utilized as a mirror for radiation passing from image-forming means to photoelectric device.

Highly integrated structures are made by using conducting segments of the zone plate as electrical contacts to photocell and to an associated amplifier, or by using these segments as contacts to a multiplicity of photocells enabling sensing of the off-axis position of an object.

By focusing radiation by means of a zone plate integrated with an ovonic switch on a point of the electrode of this switch, its switching action can be affected optically.

SPECIAL EMBODIMENTS

Figure 1:
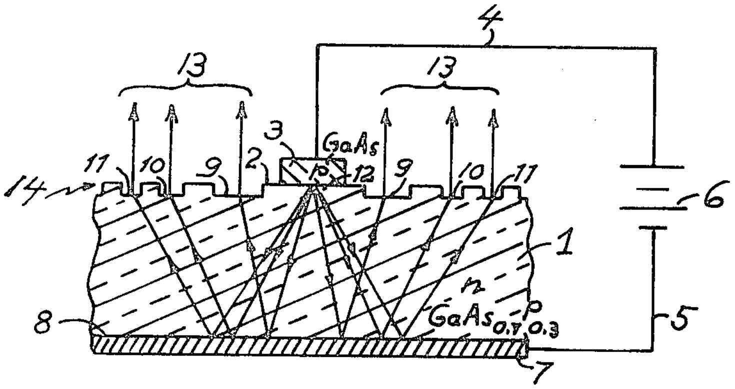
FIG. 1 shows a heterojunction light emitter integrated with a zone plate optics located at the same surface of a transparent body.

Preferred photoelectric devices of this invention are Schottky barrier contacts and PN heterojunctions. A Schottky barrier contact is a metal contact to a semiconductor causing a depletion region of majority carriers in the adjacent semiconductor. Schottky barriers arise by suitable choice of the metal (in particular, its work function) in combination with a suitable semiconducting material containing appropriate dopant impurities. For instance, in the case of a gold electrode to N-type silicon of about $10^{15}$/cc. dopant concentration, electrons leaving the gold and entering the conduction band of silicon have to overcome an energy step of 0.8 electron volt, while electrons leaving the valence band and entering the gold have to acquire an energy of 0.3 electron volt. Gold forms a Schottky barrier with P-type silicon if the dopant concentration is sufficiently large that the Fermi level in the bulk of the silicon is above the valence band by less than 0.3 electron volt.

Another well-known means of producing a Schottky barrier to silicon consists of platinum heated in contact with silicon to about 550° C. to produce platinum silicide.

Aluminum to N-type GaAs forms a Schottky barrier contact of about 0.8 electron volt barrier height.

The electron flow from a negatively biased Schottky barrier contact into the semiconductor is limited by emission rate of electrons from the metal over the barrier. The emission current is enhanced greatly by illumination of the metal with light of a sufficiently short wavelength that its photon energy is larger than the barrier height. Thus, a Schottky barrier acts as a photocell. In the preferred embodiment for this invention, the metal is illuminated through the semiconducting body.

Heterojunctions are boundaries between two semiconducting materials of somewhat different band gap. Well-known examples are mixed crystals of Ge-Si, or else GaAs-GaP differing in the concentration of the constituents at either side of the junction. Light emitted from the shorter band gap material of a forward biased PN heterojunction penetrates readily the wider band gap material, e.g., GaAs-light emission penetrates GaP.

Diffraction optical means comprise a suitable arrangement of regions diffracting incident radiation. In a circular zone plate, these regions may be opaque metallized ring-shaped zones separated by adjacent transparent rings. The opaque rings can be replaced by rings of a transparent material and of suitable thickness and refractive index to provide a phase shift $\pi$, i.e., optical path difference of $\lambda/2$, as compared with said adjacent rings. The phase shift can be caused by depositing a transparent material at certain positions, or else by shaping the surface profile of the semiconducting body. In general, many such zones are used, but only a few will be shown in the illustrations for sake of simplifying the drawings. Furthermore, dimensions are not drawn to scale for sake of clarity of representation.

The height of the transparent rings providing a phase shift of $\pi$, and the thickness of the opaque metal rings are of the order of 0.1 to 1 micron. The thickness of a transparent semiconducting wafer is typically of the order of 200 microns. For plane wave incident light to be focused on a surface photoelectric element, such as shown in FIGS. 1–5, using reflection at the back surface, the focal length becomes thus 400 microns. Considering the vacuum wavelength of light of about 1 micron, the refractive index of the semiconductor of 3–4, and the focal length of 400 microns, it is found that ring spacing of the zone plate becomes of the order of 20 microns.

This is a very convenient order of magnitude for standard semiconductor photolithography processing. By contrast, spacing the zone plate from underlying semiconductor surface by a transparent insulating layer of only 1 micron thickness, would require comparatively small ring distances, if the zone plate were designed to focus on a photoelectric element located at said surface of the semiconducting body.

Referring now to FIG. 1, there is shown in cross section a semiconducting body 1 of N-type $GaAs_{0.7}P_{0.3}$ having on its upper surface 2 an overlayed P-type GaAs layer 3. Contact leads 4 and 5 connect to battery 6 and bias the PN heterojunction 12 between 3 and 1 in the forward direction. Light emitted from the heterojunction into the body 1 is reflected on the reflecting metal coating 7 located at the back surface 8 of 1 and is emitted through front surface 2, which has ring-shaped grooves 9, 10, 11 appropriately chosen in location, width and depth to represent a zone plate optics 14 for the radiation emitted from 12, so that a plane parallel outgoing beam 13 is formed.

Figure 2:
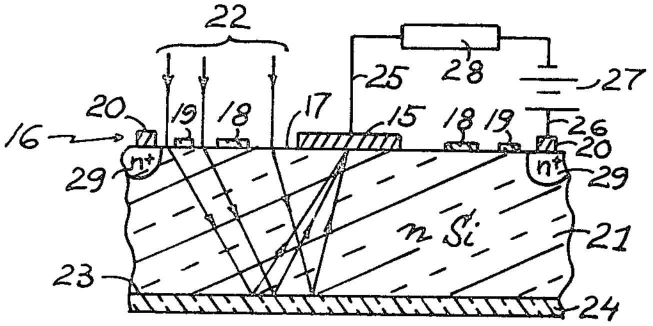
FIG. 2 shows a Schottky barrier photocell integrated with a zone plate optics located at the same surface of a transparent semiconducting body.

FIG. 2 shows a similar arrangement for a photocell exposed to incident coherent monochromatic radiation 22. N-type silicon body 21 shown in cross section carries the Schottky barrier contact 15 which represents also the central, opaque region of zone plate optics 16, located at top surface 17. Transparent $SiO_2$ ring-shaped zones 18 and 19 are also parts of the zone plate, dimensional to focus 22 onto 15 after reflection at the lower surface 23. Opaque metallized zone 20 serves as ohmic contact to underlying heavily doped $n^+$ region 29 as well as a part of 16. The lower surface 23 of 21 is coated by a reflective $SiO_2$ coating 24 dimensioned to reflect selectively the wavelength of 22. Contact leads 25 and 26 bias the Schottky barrier contact between 15 and 21 in the blocking direction by means of battery 27. Illumination of 15 causes a photocurrent through load 28 in response to 22. Note that Schottky barrier is shielded by 15 against incident undiffracted light. Rims of Schottky barrier can be shielded also by an overlay arrangement such as shown in FIG. 4.

FIG. 2 shows some electrical integration of zone plate optics in that contacts 15 and 20 are used as part of zone plate 16.

Figure 3:
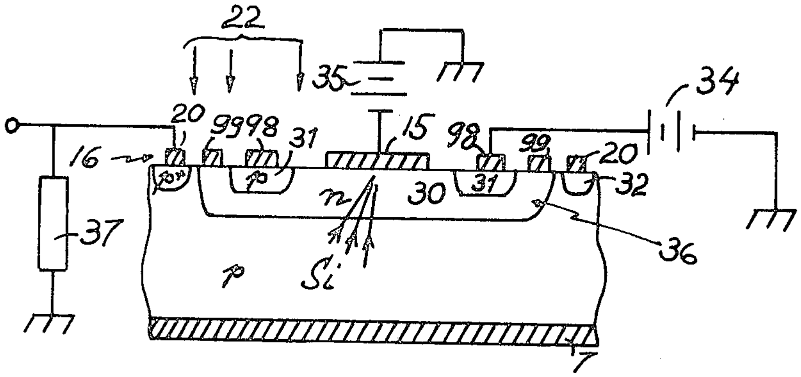
FIG. 3 shows photocell and zone plate optics of FIG. 2 integrated electrically with a bipolar transistor amplifier for the photocell current.

Further electrooptical integration is shown in FIG. 3 where opaque central zone 15 of zone plate 16 is the Schottky barrier contact to base region 30 of a PNP-transistor 36. Opaque zone 98 is a metal emitter contact to a ring-shaped $p^+$ region 31 and opaque metal zone 20 is the ohmic contact to the $p^+$ zone 32 of collector region 33. Opaque zone 99 is used only as an optical element of 16. Battery 34 provides the forward bias of emitter vs. collector and battery 35 provides the blocking bias of 15 against 30. Illumination of 15 causes flow of base current which is amplified in PNP-transistor 36 and flows through load resistance 37. Incident light 22 is diffracted onto 15 after reflection on grounded metallized base contact 7 in the same manner as shown in FIG. 2.

Figure 4:
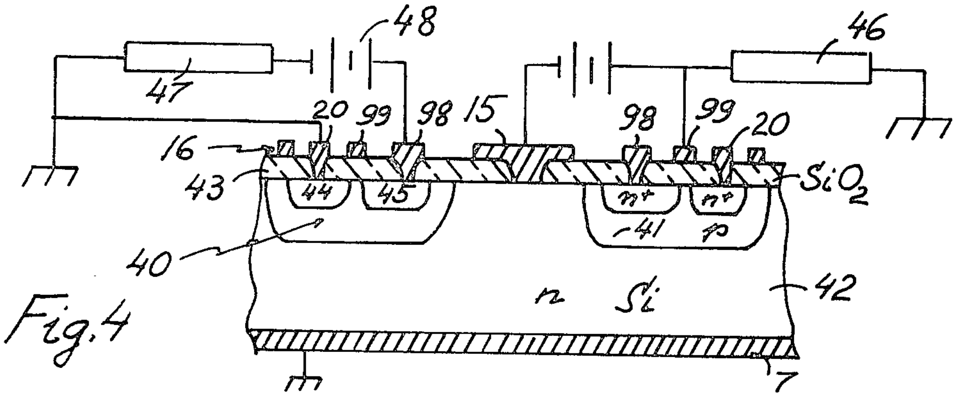
FIG. 4 shows photocell and zone plate optics of FIG. 2 integrated electrically with an insulated gate field effect transistor.

FIG. 4 shows another integrated structure of Schottky barrier photocell 15 which is central portion of zone plate optics 16. Output of 15 is amplified by insulated gate field effect transistor 40 located on ring-shaped p-silicon island 41 in n-silicon body 42. Opaque ring-shaped metal regions 98, 99 and 20 of zone plate optics 16 are spaced from silicon substrate by transparent insulating $SiO_2$ film 43 which has openings for contact access of 15, 98 and 20 to silicon. 98 and 20 are contacts to $n^+$ source and drain regions 44 and 45 of 40. 99 is insulated gate contact. Illumination of 15 by light focused by 16 on 15 after reflection on 7 stimulates electron flow from negatively biased 15 into grounded 42. This generates a potential across the large resistance 46 and thus provides a positive bias to gate 99 vs. p-substrate 41, thereby generating an n-channel current between 44 and 45, which provides amplified current through output load 47 in series with drain battery 48.

Use of a zone plate offers two advantages compared with a directly illuminated Schottky barrier without zone plate optics. First, the amount of radiation impinging on the Schottky contact is increased, enabling the selection of smaller contacts with accordingly lower emission current in the dark. Secondly, the opaque central portion of the zone plate shields the Schottky contact from direct broad spectrum illumination, thus reducing noise signals due to undesired background radiation.

Figure 5:
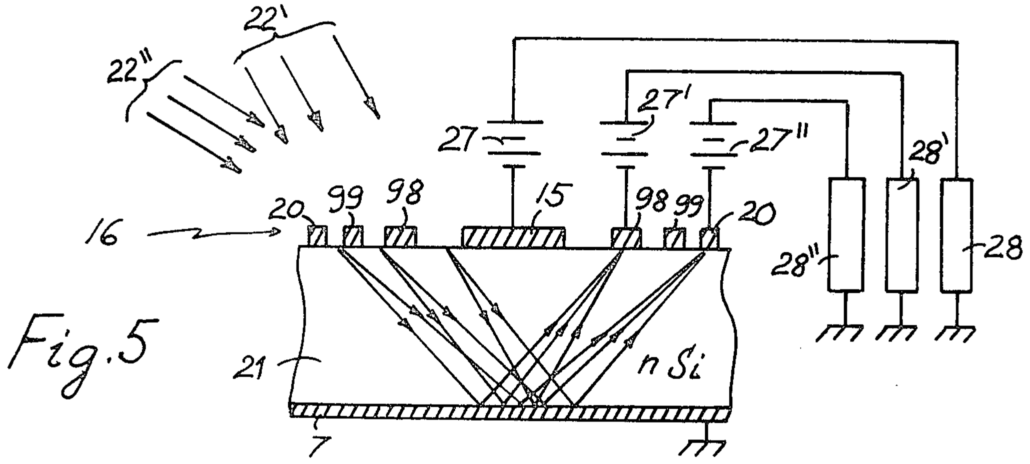
FIG. 5 shows various sections of a zone plate optics used as Schottky barrier contacts for registration of angle of incidence of radiation with respect to the optical axis of the zone plate.

FIG. 5 shows in cross section a structure similar to that of FIG. 2, except that regions 15, 98 and 20 of the zone plate 16 are now metallized Schottky barrier photocells, each connected to its own output circuit, as indicated by batteries and load resistances 27, 28; 27', 28'; 27'', 28''. Vertically incident beams 22 are focused on photocell 15 as was indicated in FIG. 2. Slanted incident beams 22'' are focused on 98, and even more slanted beams 22'' focused on 20. Thus, the arrangement of FIG. 5 permits registration of polar angle of incidence of beam with respect to optical axis of zone plate. A circular zone, such as 20, can be interrupted along certain radii and thus composed of individual sections isolated from each other thereby providing also registration of longitudinal angles of incident beams around optical axis of 16.

Figure 6:
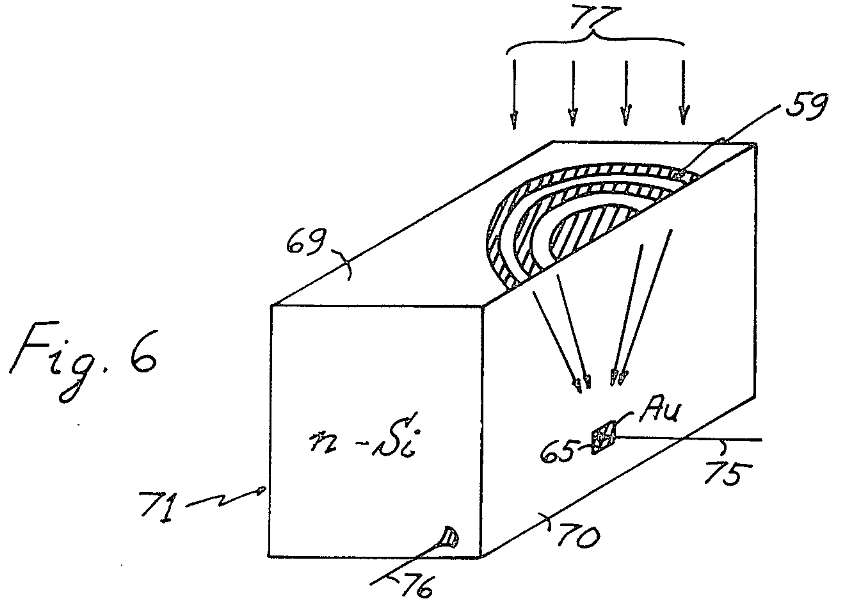
FIG. 6 shows a zone plate optics located at a first surface of a transparent semiconducting body and focusing radiation on a Schottky barrier photocell located at another surface of said body.

The zone plate optics of FIGS. 1–5 is located at the same surface of the transparent semiconducting body as the electrooptical element. FIG. 6 shows a zone plate optics 59, and a gold Schottky barrier contact 65 located at two different surfaces 69 and 70 of a semiconducting block 71 of N-type silicon. 59 focuses incident light beams 77 onto 65. Contacts to photocell 65 are 75 and 76.

Figure 7:
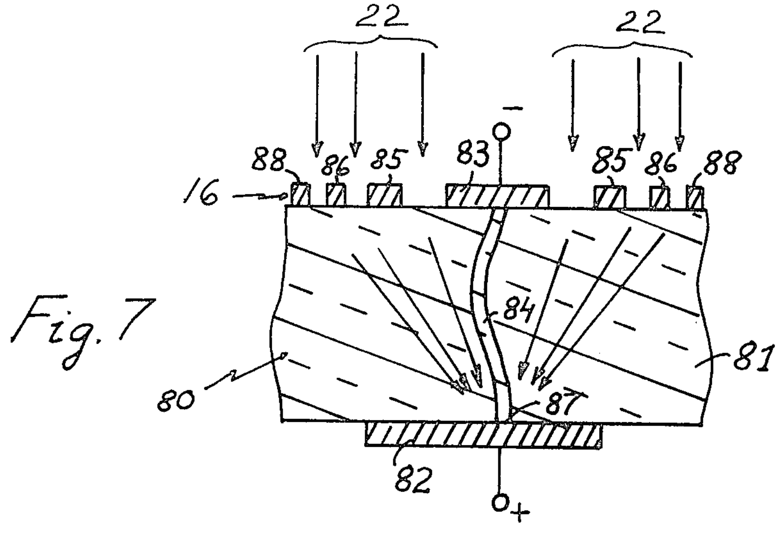
FIG. 7 shows an ovonic switch integrated with a zone plate optics according to this invention.

Another integrated electrooptical structure according to this invention is the ovonic switch 80 integrated structurally and electrically with a zone plate optics 16 as shown in FIG. 7. The ovonic switch 80 comprises an amorphous semiconducting body 81 of a glass containing 10% Ge, 12% Si, 48% Te and 30% As. The current voltage characteristics of this material between two metallic Ni contacts 82 and 83 can be of a comparatively high resistance, or else low resistance, depending on the magnitude of the applied voltage between these contacts and on the previous electrical history. Reversible, or else permanent switching from one state to the other is possible.

It is known that the permanent switch (also called memory switch) arises by formation of a conducting channel 84 representing a compositionally and crystallographically different state of the material. This channel grows from the anode 82 when applying a suitable field. According to my invention, growth of the channel can be assisted by illumination 22 focused at the anode 82 by 16. This provides an optical means for selection of the spot 87 at which the channel 84 terminates at the electrode 82. It is known that the permanently conducting state can be erased, and the insulating state introduced, by applying a high current pulse with a sharp trailing edge. I have found that this erasing can be achieved also, or at least assisted, by a properly focused light pulse of high intensity. In FIG. 7, the focusing of light beam 22 occurs by the zone plate 16, whose central region 83 serves as contact to the ovonic switch. The zones 85, 86 and 88 are dimensioned to focus incident coherent monochromatic light 22 on a position 87 of electrode 82.

The consequences of illumination on an ovonic device have been described here, using the so-called memory switch. Illumination affects also the so-called threshold switch where the conducting state changes reversibly into nonconducting state and vice versa at certain voltages. The magnitude of these voltages is affected by illumination with light concentrated on the conducting regions by a zone plate optics.

I claim:

1. An integrated electrooptical structure comprising a semiconducting body, a photoelectric device active for radiation to which said body is substantially transparent, and a diffractive image-forming means, both located at the same first surface of said body and arranged to focus said radiation with respect to said device after reflection at a second surface of said body opposite to said first surface.

2. The structure of claim 1 whereby said second surface is coated with a reflective coating dimensioned to reflect selectively at the wavelength of said radiation.

3. The structure of claim 1 whereby said photoelectric device comprises a heterojunction between said semiconducting body and another semiconducting body of smaller band gap.

4. The structure of claim 1 whereby said photoelectric device is a light-emitting circuit element.

5. The structure of claim 1 whereby said photoelectric device is a photocell and comprises a Schottky barrier contact.

6. The structure of claim 1 whereby said diffractive image-forming means is a zone plate.

7. The structure of claim 6 whereby a portion of this zone plate is conducting and is a contact to said photoelectric device.

8. The structure of claim 7 whereby another portion of said zone plate is also conducting and is a contact to an electric circuit component in said semiconducting body in circuit connection with said photoelectric device.

9. The structure of claim 8 whereby said photoelectric device is a Schottky barrier contact to the base layer of a bipolar transistor and said electric component is said bipolar transistor amplifying the photocurrent of said Schottky barrier contact.

10. The structure of claim 8 whereby said photoelectric device is a disk-shaped Schottky barrier contact to a semiconducting body, said disk-shaped contact being the central region of said zone plate, said other portion being an opaque region of said zone plate, and also the gate electrode of a field effect transistor, said field effect transistor electrically connected to amplify the photocurrent of said photoelectric device.

11. A semiconducting body, a plurality of photoelectric devices on a surface of said body, said photoelectric devices active to radiation to which said body is substantially transparent, a diffractive image-forming means on said body arranged to focus a plurality of beams of said radiation with respect to said plurality of photoelectric devices.

12. The structure of claim 11 whereby portions of said image-forming means are electric elements of said plurality of photoelectric devices and said focused radiation passing between said image-forming means and said plurality of devices is reflected at the opposite surface of said body.

13. The structure of claim 11 whereby said photoelectric devices are Schottky barrier photocells, and said image-forming means is a zone plate, comprising conducting opaque regions as Schottky barrier contacts to said photocells.

14. A semiconducting body, a photoelectric device active for radiation to which said semiconducting body is substantially transparent and located at a first surface of said body, an image-forming means located at a second surface of said body, and focusing said radiation with respect to said photoelectric device, said second surface being substantially orthogonal to said first surface.

15. An ovonic switch integrated with a zone plate into a monolithic solid structure whereby part of said zone plate is a contact to said ovonic switch.

16. The structure of claim 15 whereby said zone plate is designed to focus radiation on the channel of said ovonic switch thereby affecting its electrical characteristic.

* * * * *